United States Patent

Gillard et al.

[11] Patent Number: 5,926,612
[45] Date of Patent: Jul. 20, 1999

[54] APPARATUS FOR RECORDING DATA WITH A MULTI-LEVEL ARRANGEMENT OF ERROR CORRECTION CODING

[75] Inventors: Clive Henry Gillard, Kempshott; James Hedley Wilkinson, Heathlands; Michael John Ludgate, Kings Furlong; Jonathan James Stone, Mortimer, all of United Kingdom

[73] Assignees: Sony Corporation, Tokyo, Japan; Sony United Kingdom Limited, Weybridge, United Kingdom

[21] Appl. No.: 08/598,365

[22] Filed: Feb. 8, 1996

[30] Foreign Application Priority Data

Feb. 20, 1995 [GB] United Kingdom .................... 9503297

[51] Int. Cl.$^6$ ...................................................... H04N 5/76
[52] U.S. Cl. .......................................... 386/122; 386/124
[58] Field of Search .............................. 386/46, 109, 112, 386/124, 36, 40, 122; 360/32, 48; H04N 5/76, 5/782

[56] References Cited

U.S. PATENT DOCUMENTS

| | | | |
|---|---|---|---|
| 4,429,334 | 1/1984 | Hashimoto et al. | 386/40 |
| 4,737,863 | 4/1988 | Eto et al. | 386/36 |
| 4,785,358 | 11/1988 | Ninomiya | 386/112 |
| 4,882,732 | 11/1989 | Kaminaga | 360/53 |
| 5,047,865 | 9/1991 | Inoue | 386/36 |
| 5,216,719 | 6/1993 | Oh | 381/36 |
| 5,317,457 | 5/1994 | Matsumi et al. | 360/48 |
| 5,394,275 | 2/1995 | Iketani et al. | 386/123 |
| 5,465,181 | 11/1995 | Yoshinaka | 386/124 |
| 5,675,696 | 10/1997 | Ishimoto et al. | 386/122 |
| 5,677,981 | 10/1997 | Kato et al. | 386/122 |
| 5,682,457 | 10/1997 | Woo et al. | 386/122 |

*Primary Examiner*—Thai Tran
*Attorney, Agent, or Firm*—Frommer Lawrence & Haug LLP; William S. Frommer; Dennis M. Smid

[57] ABSTRACT

An apparatus for recording video data with a multi-level arrangement of error correction coding. Input video data is demultiplexed so as to form a plurality of data streams each having a plurality of data blocks. A stream error correcting code is generated for each of the plurality of data streams, which is adaptable to allow correction of a data block. The respective data blocks and stream error correcting code of each data stream is distributed or arranged in a predetermined manner. The distributed data blocks and stream error correcting code of each data stream are recorded on recording tracks of a recording medium by n recording heads such that only either a data block or a stream error correcting code of a respective data stream is recorded at corresponding positions along n adjacent recording tracks of the recording medium. Additionally, track error correction codes and inner error correction codes may be provided which may enable correction of data recorded on a respective track and error correction for inner blocks, respectively.

15 Claims, 5 Drawing Sheets

APPARATUS FOR RECORDING DATA WITH A MULTI-LEVEL ARRANGEMENT OF ERROR CORRECTION CODING

BACKGROUND OF THE INVENTION

1. Field of the Invention

This invention relates to digital tape recorders/players such as, for example, digital video tape recorders.

2. Description of the Prior Art

Helical scanning magnetic tape recording is used in applications which require a high density of information to be recorded on a magnetic tape. When a tape is being recorded or replayed, it is wrapped in a gentle helical path around the surface of a rotary head drum which carries one or more magnetic heads. The tape advances around the drum by only a short distance during one revolution of the drum so that the heads record to, or replay from, a succession of parallel oblique tracks extending along and across the tape.

This recording technique is particularly suited for use in digital video recording. Here, a number of record/replay heads are mounted on the head drum to provide access to a group of adjacent recording tracks on the tape, with the video data being distributed between the different heads.

In digital video tape recorders it is necessary to take precautions against the loss of video data through tape damage, head malfunction, temporary "drop outs" and the like. These error handling techniques are particularly important in digital video tape recorders in which the video data is compressed before being recorded, for example using the so-called "MPEG" (Motion Pictures Experts Group) compression technique. This is because in techniques of this type, the reconstruction of a particular pixel may rely on a number of bytes of the compressed data. Similarly, the reconstruction of a frame of the output video signal often relies on data from temporally preceding or following frames, so the loss of a particular portion of the video data may not only affect that frame but also other frames which also depend on that data.

Error handling precautions often include providing error detecting and/or correcting codes in the recorded data, and error concealment systems in the replay processing. However, a particularly serious data loss (for example, the complete malfunction of one of the heads or a portion of serious tape damage extending across a large region of the tape) may defeat these error handling techniques.

It has been proposed to allow for the complete loss of selective groups of record/replay heads in a multi-head digital video tape recorder by spatially de-interleaving the image data into effectively "odd" and "even" samples along each line. The "odd" and "even" data streams are then separately compressed and are recorded on respective different groups of record heads. The technique facilitates error concealment when the image data is replayed, because even if an entire group of heads is lost, the data recorded by the other group will provide alternate samples of a reconstructed picture, from which the missing samples can be interpolated.

However, this technique is not ideal, because the de-interleaving process introduces distortions of its own, so that, for example, a 4:1 compression process performed after de-interleaving produces image quality corresponding to about a 5.4:1 compression performed directly on the source data.

SUMMARY OF THE INVENTION

This invention provides a digital tape recorder comprising:

an error correcting code generator for generating an error correcting code from each of a plurality of input data streams, the error correcting code being sufficient to allow correction of at least a $1/(n-1)$ proportion of the input data stream where n is an integer greater than 1, each input data stream and the respective error correcting code forming a composite data stream;

n recording heads for recording data on substantially parallel recording tracks on a tape medium; and means for distributing each composite data stream between the n recording heads for recording, so that at corresponding positions along the n recording tracks data from each composite data stream is recorded by no more than one of the recording heads.

The invention addresses the problems of severe data errors or even complete head losses in digital tape recorders. Instead of using a de-interleaving process which can introduce distortions of its own, a more thorough error correcting code arrangement is used, so that the error correcting code used allows for the correction of at least one completely lost track of data (i.e. one complete head loss).

Each composite data stream (of an input data stream and its corresponding error correcting code) are distributed (preferably substantially evenly) between the n recording heads. This means that the loss of one head loses only a part of each composite data stream. If that part represents data from the input data stream, then the lost data could be reconstructed using the corresponding error correcting code (recorded on a different head). If the error correcting code is lost for a particular composite data stream, then the remaining data should be intact. (In fact, in preferred embodiments, further error correction is applied to cope with relatively minor data errors in the remaining data).

A further precaution is applied to protect against major data errors which may damage a portion of a number of tracks. Examples of this type of data error are longitudinal scratches or edge damage on a helically scanned tape. In order to protect against this type of error, which would affect corresponding positions on a number of tracks, the data is distributed between the tracks so that at corresponding positions along the n recording tracks data from each composite data stream is recorded by no more than one of the recording heads. Once again, this measure reduces the loss to any particular composite data stream to a level which should be correctable by the error correcting code associated with that data stream.

The invention is particularly applicable for use with helical scanning tape recorders. However, use with a stationary-head recorder is also envisaged.

For further protection against errors affecting a part of the input data and the corresponding part of the error correcting code required to correct that data, and since the size of an error correcting code capable of correcting a $1/(n-1)$ proportion of the data will generally be of the order of $1/n$ of the resulting composite (total) data steam, it is preferred that the error correcting code for each composite data stream is recorded by a single respective recording head.

Although the invention is applicable to many types of data, such as financial or audio data, the invention is suited for use with input data streams comprising video data. In particular, because of the significant effect that data errors can have on compressed video data, the invention is particularly well suited for use with input data streams comprising compressed video data. If necessary, recording space for the ECC being provided by applying a slightly heavier compression ratio, with the resulting slight signal degradation being compensated for by the improved error handling characteristics of the recorder.

Although the compressed video data could be supplied externally to the recorder, it is preferred that the recorder is capable of receiving and handling uncompressed video. To this end, it is preferred that the recorder comprises data compression means for compressing an input uncompressed video signal, and for demultiplexing the resulting compressed video signal into the input data streams.

As an extra precaution against, for example, further drop-outs which may occur on other tracks when a particular track is lost, it is preferred that the recorder comprises means for generating respective track error correcting codes from data recorded by each of the recording heads, the track error correcting code for each recording head being recorded on the tape medium by that recording head.

As yet another protection against data errors, it is preferred that data is recorded by each recording head as successive data blocks, the recorder comprising means for adding an inner error correcting code to each data block, the inner error correcting code for a data block being generated from that data block.

Although many known error correcting codes are suitable for use with the invention, in a preferred embodiment at least one of the error correcting code, the track error correcting code and the inner error correcting code is a Reed-Solomon code. Alternatively (or in addition), at least one of the error correcting code and the track error correcting code could be a parity-checking code.

It is preferred that the recorder also acts as a tape player, by incorporating means for replaying data previously recorded on a tape medium. It will be appreciated that the replaying means could include separate replay heads or combined record/replay heads, error correction means responsive to the error correcting codes described above, and/or data decompression means.

This invention also provides a digital tape medium having a plurality of substantially parallel recorded tracks, on which a plurality of composite data streams, each comprising an input data stream and a respective error correcting code generated from that input data stream, are distributed between the plurality of recorded tracks, so that, at corresponding positions along the plurality of recorded tracks, data from each composite data stream is recorded on no more than one of the recorded tracks.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
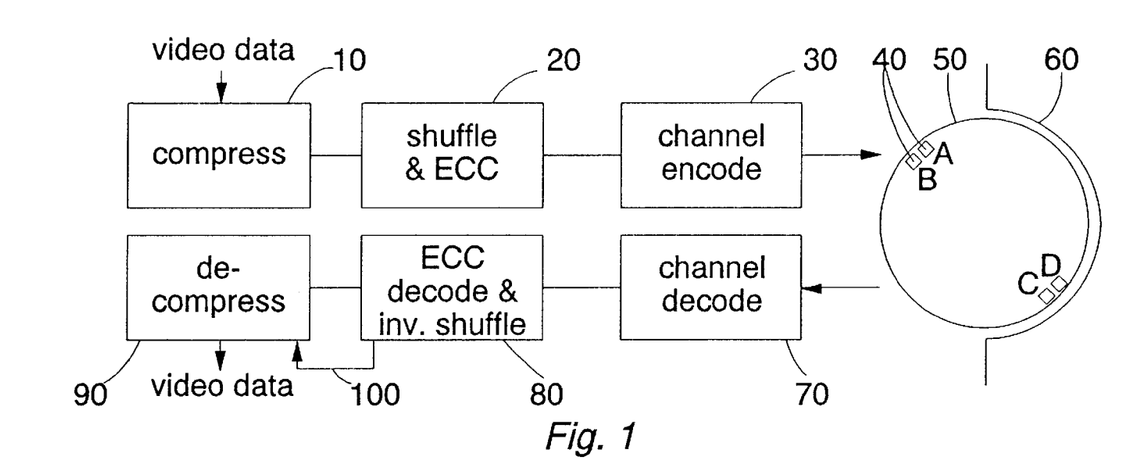
FIG. 1 is a schematic diagram of a digital video tape recorder.

Referring now to FIG. 1, a digital video tape recorder/player (DVTR) comprises a data compressor 10 for receiving input (uncompressed) video data and compressing the video data to reduce the number of bits required to encode the video, a shuffler and error correcting code (ECC) encoder 20 and a channel encoder 30. The channel encoder 30 supplies channel-encoded data to four magnetic record/replay heads 40, referenced as heads A, B, C and D. The heads 40 are mounted on a rotary head drum 50 so that a tape 60 is helically scanned by the heads 40.

In a replay mode, data read from the tape 60 by the heads 40 is supplied first to a channel decoder 70, then to an ECC decoder and inverse shuffler 80, followed by a data decompressor 90. Along with the compressed video data supplied to the decompressor 90, the ECC decoder and inverse shuffler 80 also supplies error flags 100 indicating the validity of the supplied data.

The data compressor 10 and the data decompressor 90 use complementary compression and decompression algorithms, such as the "MPEG" algorithm described in many publications such as "The MPEG Systems Coding Specification", A G MacInnis, Signal Processing Image Communication 4 (1992) April, No. 2. Because video data compression is well described elsewhere, the internal operation of the data compressor 10 and the data decompressor 90 will not be described in detail in this document.

The operation of the shuffler and ECC encoder 20, and the complementary operation of the ECC decoder and inverse shuffler 80, will be described in more detail below.

Channel encoding (and complementary decoding) is again described extensively in other publications, such as the book "Introduction to the 4:2:2 Digital Video Tape Recorder (S Gregory, Pentech Press, 1988). Briefly, channel coding is carried out to ensure that the digital signals to be recorded on the tape 60 have properties (such as frequency distribution) suitable for the response of the magnetic tape 60. Channel coding is often performed with a simple look-up table. The channel decoder 70 simply reverses the operation of the channel encoder 30.

In the embodiment of FIG. 1, four magnetic heads 40 are arranged in two groups of two heads, and the tape 60 has a wrap angle of about 180°. This leads to a track pattern of the form shown schematically in FIG. 2.

Figure 2:
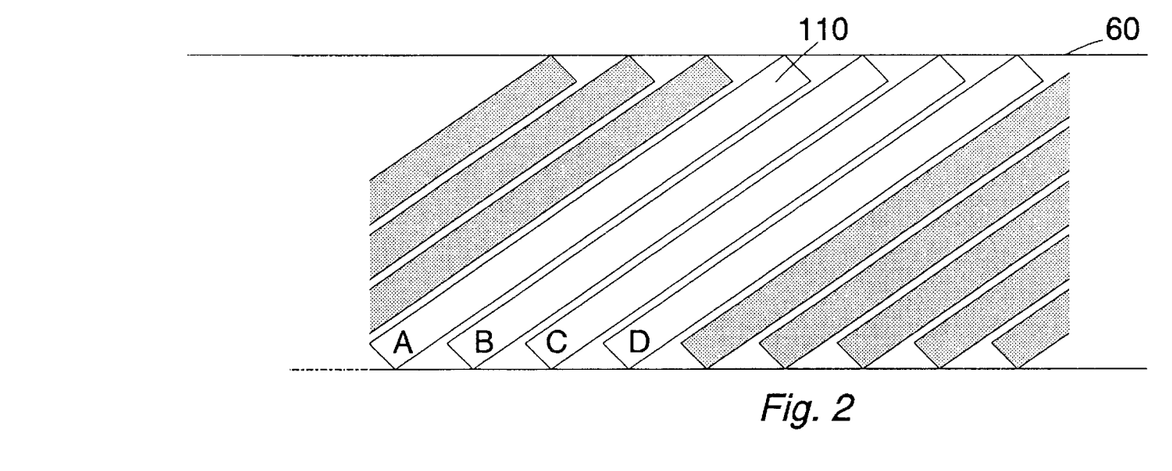
FIG. 2 schematically illustrates a track pattern recorded by the recorder of FIG. 1.

In FIG. 2 successive tracks are formed as oblique strips 100 on the tape 60. The tracks from the four magnetic heads 40, A, B, C and D form a group of adjacent, substantially parallel tracks. This sequence is repeated along the tape.

A similar track pattern could be obtained by using a so-called "omega" wrap (nearly 360°), with a single group of four adjacent heads.

Figure 3:
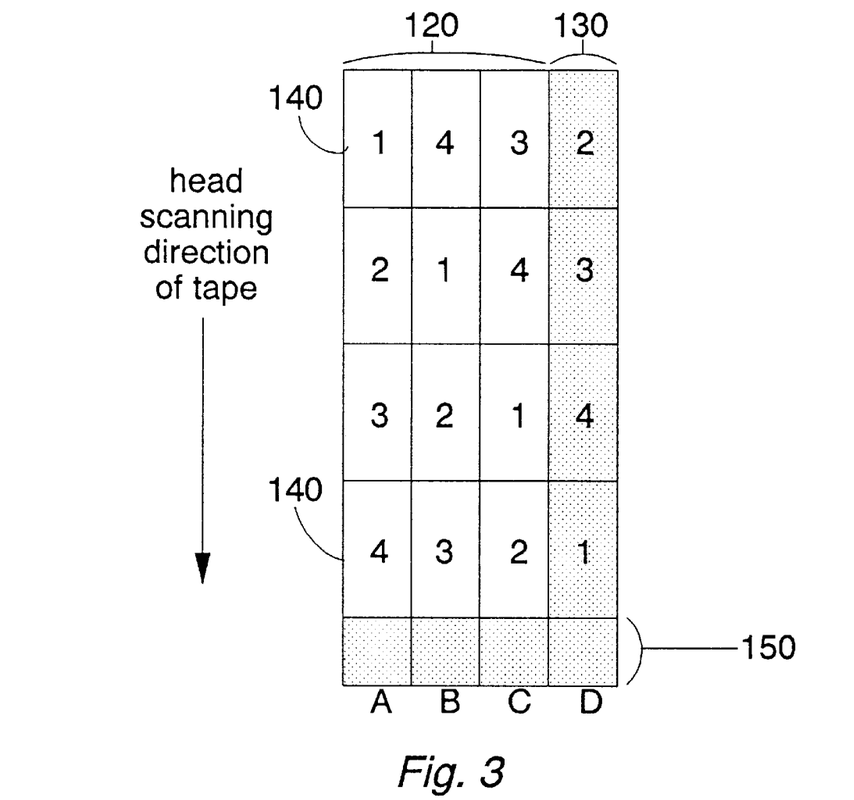
FIG. 3 schematically illustrates the layout of data on a tape recorded by the recorder of FIG. 1.

FIG. 3 schematically illustrates the layout of data on the tape 60 as recorded by the recorder of FIG. 1.

The arrangement of the data for recording is carried out by the data shuffler and ECC encoder 20. (The channel encoder 30 simply forms channel encoding on whatever data is passed to it, and forwards the channel encoded data to the magnetic heads 40.) The shuffler and ECC encoder 20 receives a single stream of compressed video data from the data compressor 10 and demultiplexes that stream into four separate data streams, which will be referenced by the numbers 1, 2, 3 and 4. Each data stream is then split into three blocks 140 for recording by a group 120 of three of the magnetic heads. (In the example of FIG. 3, these are the heads A, B and C.) A "stream" error-correcting code 130 is derived from each data stream, and is shown in FIG. 2 with the same reference (1, 2, 3 or 4) as the respective data stream. This ECC is of the same size as one of the blocks 140 of video data, and provides sufficient protection to allow the video data to be corrected if one whole block 140 of data is lost.

The shuffler and ECC encoder 20 distributes the data for each data stream and its associated stream ECC 130 (i.e. a composite data stream) between the four magnetic heads 40 so that substantially equal proportions of each data stream are recorded on the group of heads 120 and the ECC is recorded on the remaining head (in this case, head D). At any position along a track (i.e. in the head scanning direction) data corresponding to one of the data streams (either video data or the ECC) is recorded on no more than one of the magnetic heads 40. For example, in the top row of FIG. 3, representing the first part of the tracks scanned by the four magnetic heads 40, data from the data stream 4 only on head B.

As described earlier, this arrangement provides protection against one complete head loss or longitudinal tape damage such as a tape scratch.

The shuffler and ECC encoder 20 then derives a second ECC, which will be referred to as a "track" ECC 150, which provides a degree of correction for the data recorded on that track. In other words, for each of the four tracks of FIG. 3 (shown as vertical columns), the track ECC 150 provides a degree of correction for the data recorded in that column of FIG. 3. The track ECC 150 does not provide such thorough protection as the stream ECC 130, but does allow small drop-outs or other data errors to be corrected.

The final level of error correcting code generation takes place when the data to be recorded on the tape is formatted into individual data blocks, referred to here as "inner" blocks. Each inner block is of the order 100 bytes long, and carries a short Reed-Solomon "inner" ECC allowing error correction and detection for that inner block. This technique is again described in the book by Gregory detailed above.

In summary, the shuffler and ECC encoder 20 generates three levels of ECC, namely the stream ECC 130, the track ECC 150 and the inner ECC, and also distributes blocks 140 of data and the stream ECC 130 across the four recording heads and along the tracks so that, at corresponding positions along the tracks, data or ECC from each data stream is recorded on no more than one of the recording tracks. The track and stream ECCs could be, for example, Reed-Solomon or parity checking codes.

Figure 4:
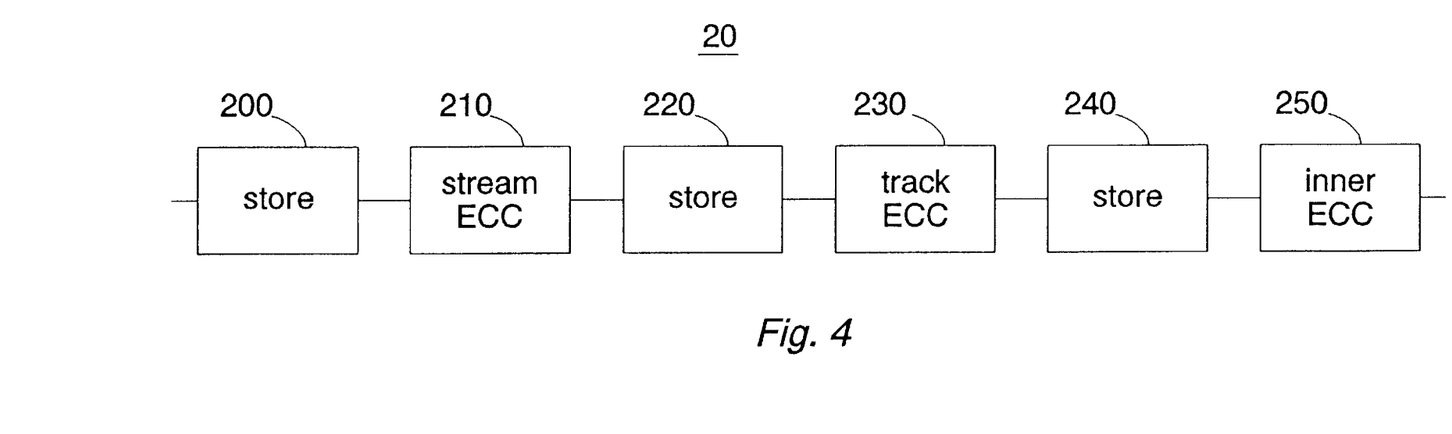
FIG. 4 is a schematic block diagram of an error correcting code generator.

FIG. 4 is a schematic block diagram of a shuffler and error correcting code generator 20.

Compressed video data from the data compressor 10 is written into a frame store 200. In fact, the data is written into the store 200 at positions (addresses) corresponding to the layout of blocks 140 in the non-shaded area of FIG. 3. In other words, the shuffling of blocks of the four data streams is carried out as the data is written into the frame store 200.

A channel ECC generator 210 reads the compressed video data from the frame store 200, and computes corresponding stream ECCs. As part of its operation, the stream ECC generator 210 writes the data from each data stream and the corresponding stream ECC into a second frame store 220.

A track ECC generator 230 reads columns of data from the second frame store 230, generates the track ECC, and writes the resulting data and ECC into a third frame store 240. Since the frame store 220 contains not only the compressed data but also the stream ECC, the track ECC generator 230 generate track ECCs to protect both the video data and the stream ECC. This means that small data errors in the stream ECC blocks can be corrected by the track ECC.

Finally, an inner ECC generator 250 operates on small contiguous blocks of the data contained in the frame store 240 and appends a short inner ECC to each data block for recording.

Figure 5:
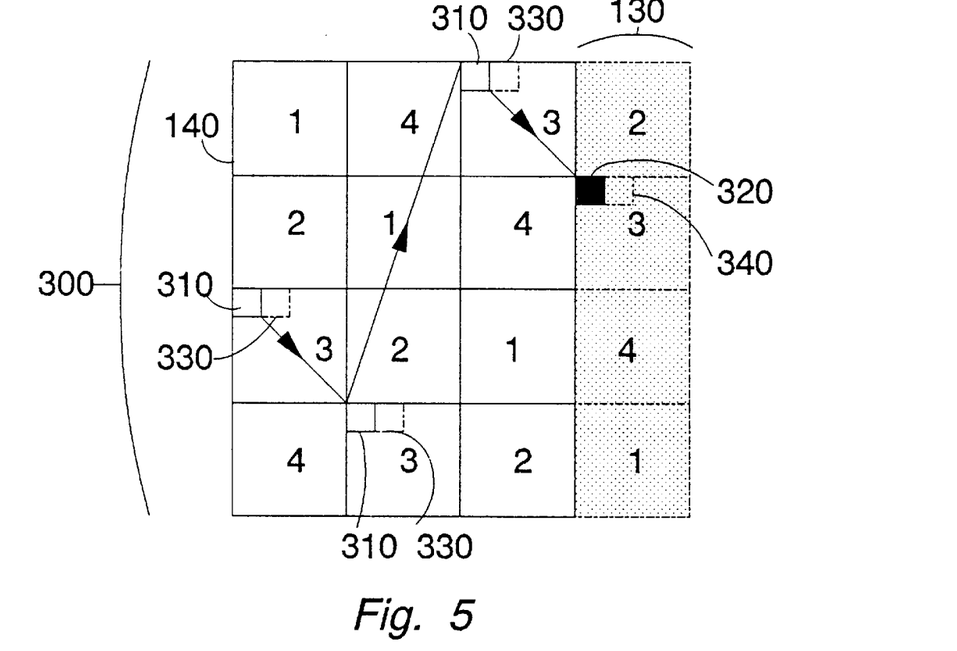
FIG. 5 schematically illustrates the generation of a channel error correcting code.

FIG. 5 schematically illustrates the operation of the stream ECC generator 210 in more detail.

The frame store 200 contains the compressed video data output by the data compressor 10, arranged in four rows 300 each of three blocks 140 of the compressed video data. The stream ECC generator 210 reads data bytes 310 at corresponding positions in the blocks 140 for a particular data stream (in FIG. 5, this process is illustrated for data stream 3) and generates a corresponding byte 320 of the stream ECC 130. The stream ECC generator then repeats this process for adjacent bytes 330 of each block 140, to generate a further ECC byte 340 and so on. The compressed video data blocks 140 and the blocks of stream ECC 130 are written during this process into the second frame store 220, which accordingly has four rows of four blocks of data.

Figure 6:
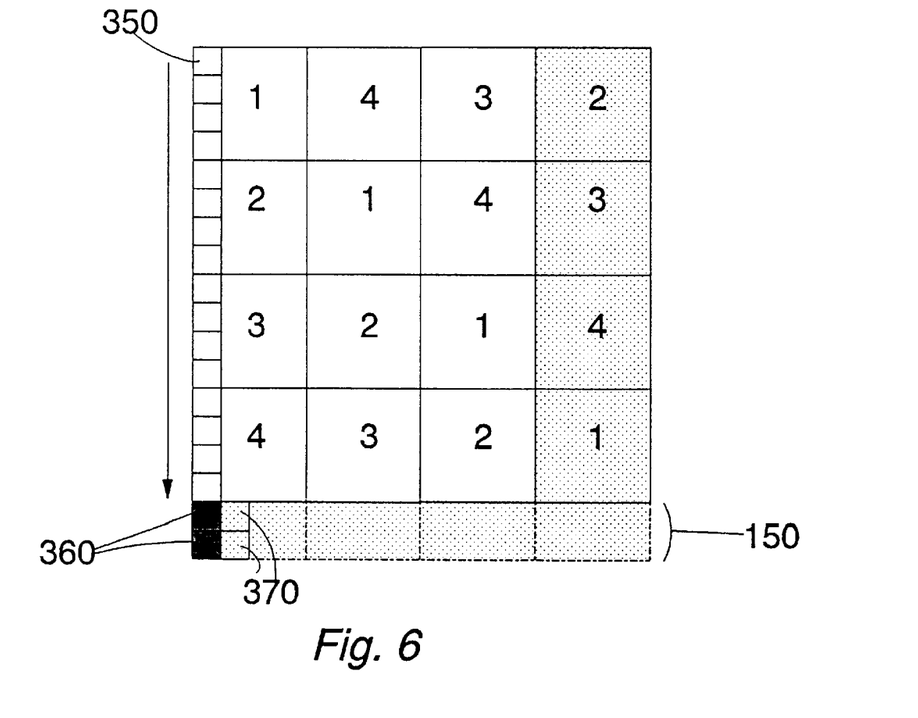
FIG. 6 schematically illustrates the generation of an outer error correcting code.

FIG. 6 schematically illustrates the operation of the track ECC generator 230.

The track ECC generator 230 operates on the four rows of four blocks of data stored in the second frame store 220. The track ECC generator reads a column of bytes 350 of data stored in the second frame store 220, and generates two bytes 360 of track ECC 150 from that column. The track ECC generator 230 then repeats this process for each column, in each case generating two bytes (e.g. the bytes 370) of track ECC. During this process, the track ECC generator 230 writes the 16 resulting blocks of data (from the frame store 220 and the newly-generated track ECC bytes 150) into the third frame store 240.

Figure 7:
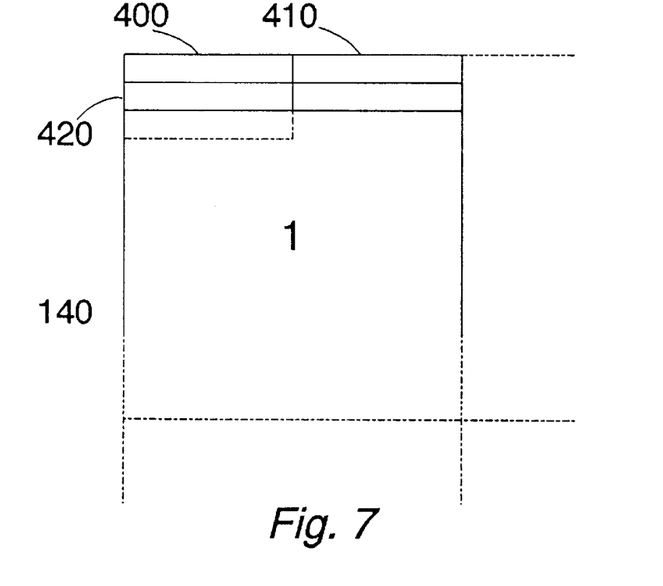
FIG. 7 schematically illustrates the process of reading inner data blocks from a frame store.

FIG. 7 illustrates the operation of the inner ECC generator 250.

FIG. 7 is in fact an enlarged view of the top left block 140 of FIGS. 3, 4 or 6. The inner ECC generator 250 reads relatively small, contiguous blocks 400, 410, 420, . . . of the data block 140, and generates a short (e.g. four bytes) ECC from each inner block. This inner ECC is appended to the inner block, which is then passed to the channel encoder 30 for recording.

Figure 8:
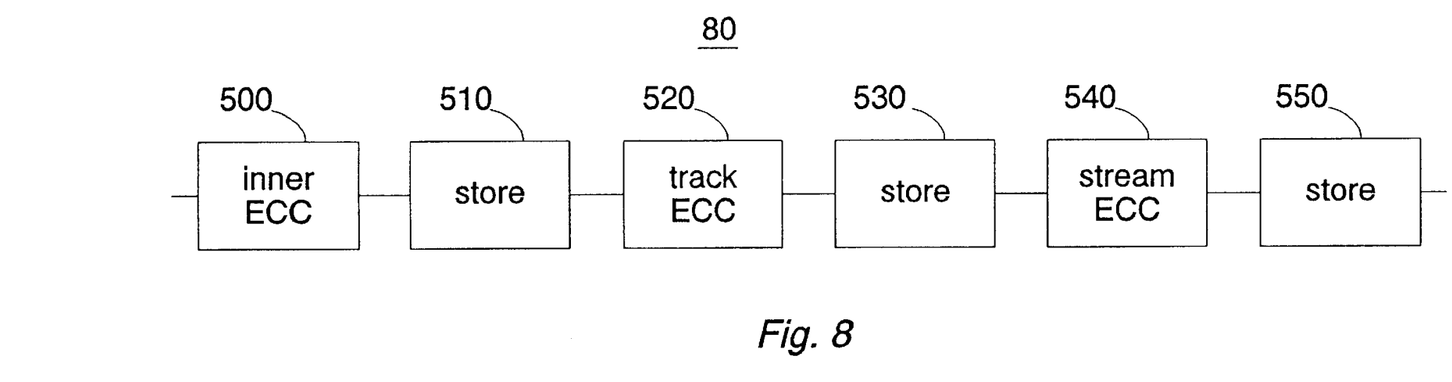
FIG. 8 is a schematic block diagram of an error correcting code decoder.

FIG. 8 is a schematic block diagram of the ECC decoder and inverse shuffler 80 of FIG. 1.

The ECC decoder and inverse shuffler 80 comprises an inner ECC decoder 500, a frame store 510, a track ECC decoder 520, a frame store 530, a stream ECC decoder 540 and an output frame store 550.

The operation of the three ECC decoders 500, 520, 540 is complementary to that of the encoders shown in FIG. 4. The frame stores 510, 530 and 550 are used for the transfer of data between the ECC decoders, and also (in the case of the final frame store 550) for the block shuffling operation carried out when the data was written into the frame store 200 to be reversed.

The ECC decoders are operable to flag data for which errors have been detected but (due to the severity of the error) has not been corrected. At the end of the processing carried out by the ECC decoder and inverse shuffler 80, and remaining uncorrected errors are flagged by error flags 100, which are passed to the data decompressor 90. These error flags are used in conventional manner to indicate that error concealment is required for the erroneous video data.

Figure 9:
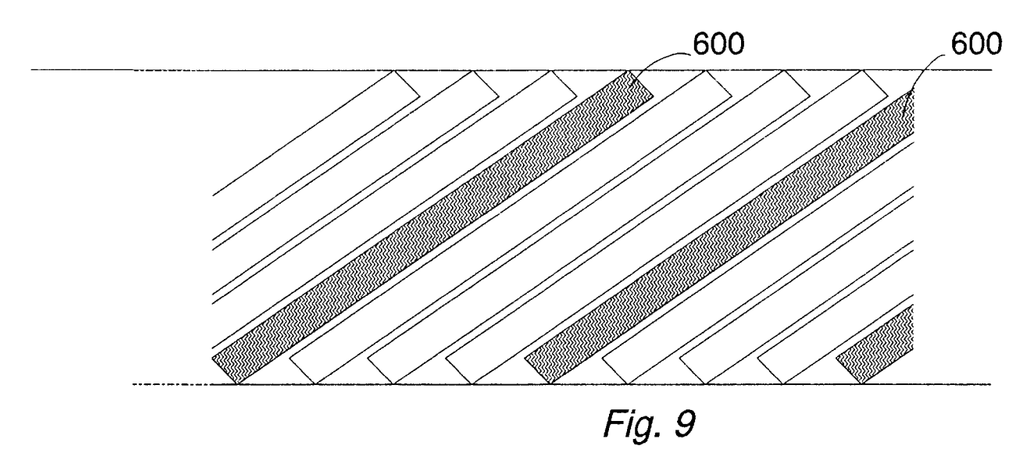
FIG. 9 schematically illustrates the effect of a head failure in the recorder of FIG. 1.
Figure 10:
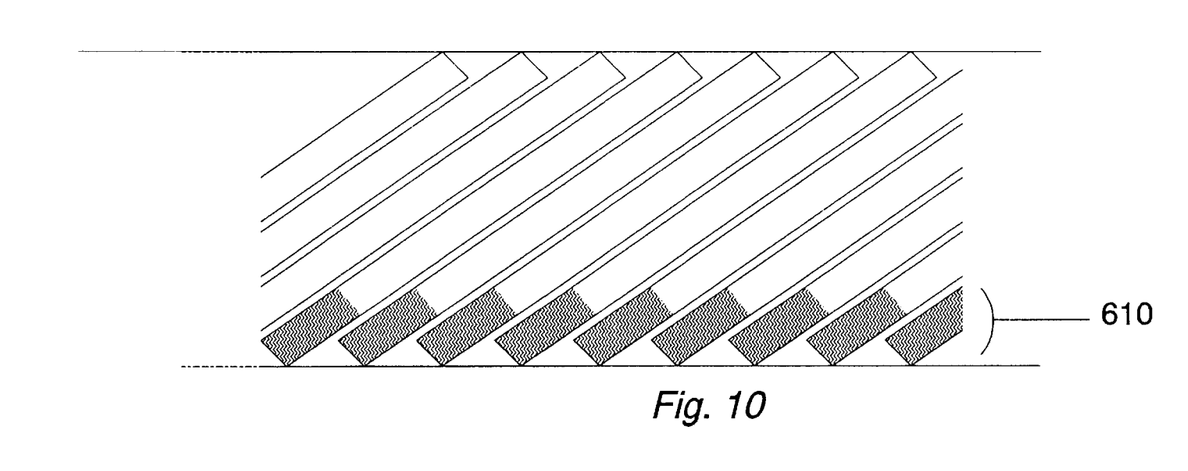
FIG. 10 schematically illustrates the effect of damage to the edge of a tape medium.

Finally, FIGS. 9 and 10 illustrate the effect of recording or replay faults on the recorded data. In particular, FIG. 9 schematically illustrates the effect of a head failure in the recorder of FIG. 1. In this case, every fourth track 600 cannot be read. However, using the techniques described above, the data from that track can be reconstructed using the ECC 130. Alternatively, if the erroneous track 600 actually carries the ECC 130 for a particular data stream, this means that the remaining three tracks carry all of the video data required for that stream.

In FIG. 10, the edge portion 610 of a tape is damaged, which means that some or all of a row of blocks 140 (FIG. 3) will be unreadable. However, if the remaining three rows of blocks are readable, the missing block can be reconstructed for each data stream.

In other embodiments the head drum could rotate at a different frequency to the field rate of the input video signal. For example, a head drum having four heads (as above) could rotate at 75 revolutions per second for a 50 Hertz field rate video signal, in which case groups of 12 adjacent tracks storing two video fields would be recorded.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A digital tape recorder comprising:
   an error correcting code generator for generating an error correcting code from each of a plurality of input data streams, said error correcting code being sufficient to allow correction of at least a 1/(n−1) proportion of said input data stream where n is an integer greater than 1, each said input data stream and said respective error correcting code forming a composite data stream;
   n recording heads for recording data on substantially parallel recording tracks on a tape medium; and
   means for distributing the respective input data stream and the respective error correcting code of each composite data stream between said n recording heads for recording such that at least one respective data portion of each data stream is recorded by more than one of the recording heads and such that at corresponding positions along said n recording tracks data from the respective input data stream and the respective error correcting code of each composite data stream is recorded by no more than one of said recording heads.

2. A recorder according to claim 1, in which said error correcting code for each composite data stream is recorded by a single respective recording head.

3. A recorder according to claim 1, in which said input data streams comprise video data.

4. A recorder according to claim 3, in which said input data streams comprise compressed video data.

5. A recorder according to claim 4, comprising data compression means for compressing an input uncompressed video signal, and for demultiplexing said resulting compressed video signal into said input data streams.

6. A recorder according to claim 1, comprising means for generating respective track error correcting codes from data recorded by each of the recording heads, said track error correcting code for each recording head being recorded on said tape medium by that recording head.

7. A recorder according to claim 6, in which data is recorded by each recording head as successive data blocks, said recorder comprising means for adding an inner error correcting code to each data block, said inner error correcting code for a data block being generated from that data block.

8. A recorder according to claim 7, in which at least one of said error correcting code, said track error correcting code and said inner error correcting code is a Reed-Solomon code.

9. A recorder according to claim 7, in which at least one of said error correcting code and said track error correcting code is a parity-checking code.

10. A recorder according to claim 1, comprising means for replaying data previously recorded on a tape medium.

11. A digital tape medium having a plurality of substantially parallel recorded tracks, on which a plurality of composite data streams, each comprising an input data stream and a respective error correcting code generated from that input data stream, are distributed between said plurality of recorded tracks such that at least one respective data portion of each data stream is recorded on more than one of said recorded tracks and such that at corresponding positions along said plurality of recorded tracks data from the respective input data stream and the respective error correcting code of each composite data stream is recorded on no more than one of said recorded tracks.

12. A recording apparatus comprising:

means for receiving input data and for generating therefrom a plurality of data streams each having a plurality of data blocks;

error correcting code generator means for generating a stream error correcting code for each of the plurality of data streams, each said stream error correcting code being adaptable to allow correction of a data block;

n recording heads (where n is an integer greater than 1) for recording the data blocks and stream error correcting code of each data stream on recording tracks of a recording medium; and means for arranging the respective data blocks and the respective stream error correcting code of each data stream in a predetermined manner and for supplying the same to the recording heads such that at least one respective data block of each data stream is recorded by more than one of the recording heads and such that each recording head only records one of a data block and the stream error correcting code of a respective data stream at corresponding positions along n adjacent recording tracks so that only one of a data block and a stream error correcting code of a respective data stream is recorded at said corresponding positions along the n adjacent recording tracks of said recording medium.

13. A recording apparatus according to claim 12, further comprising means for generating respective track error correcting codes from the data blocks and the stream error correcting codes and for recording the generated track error correcting codes.

14. A recording apparatus according to claim 13, further comprising means for generating an inner error correcting code and for adding the same to the data blocks.

15. A recording apparatus according to claim 12, wherein the stream error correcting code for each of the plurality of data streams is recorded by only one of the recording heads and the respective data blocks of each data stream are recorded only by the remaining recording heads.

* * * * *